(12) United States Patent
Chang et al.

(10) Patent No.: US 10,367,227 B2
(45) Date of Patent: Jul. 30, 2019

(54) ELECTROLYTE COMPOSITION AND METAL-ION BATTERY EMPLOYING THE SAME

(71) Applicant: Industrial Technology Research Institute, Hsinchu (TW)

(72) Inventors: Che-Wei Chang, Taichung (TW); Wen-Sheng Chang, Hsinchu (TW); Chun-Tsung Hsu, Tainan (TW); Yu-Wen Yeh, Xinfeng Township, Hsinchu County (TW); Tai-Feng Hung, Taipei (TW); Chang-Chung Yang, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 158 days.

(21) Appl. No.: 15/623,041

(22) Filed: Jun. 14, 2017

(65) Prior Publication Data

US 2017/0358815 A1     Dec. 14, 2017

Related U.S. Application Data

(60) Provisional application No. 62/349,990, filed on Jun. 14, 2016.

(30) Foreign Application Priority Data

Dec. 12, 2016   (TW) .............................. 105141022 A

(51) Int. Cl.
*H01M 4/36*      (2006.01)
*H01M 4/38*      (2006.01)
*H01M 4/58*      (2010.01)
(Continued)

(52) U.S. Cl.
CPC ......... *H01M 10/056* (2013.01); *H01M 4/366* (2013.01); *H01M 4/38* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 7,972,492 | B2 | 7/2011 | Pitner et al. |
| 9,236,643 | B2 | 1/2016 | Friesen et al. |

(Continued)

FOREIGN PATENT DOCUMENTS

| | | |
|---|---|---|
| CN | 103545549 A | 1/2014 |
| JP | 2003-257487 A | 9/2003 |

(Continued)

OTHER PUBLICATIONS

Taiwanese Office Action and Search Report, dated Sep. 14, 2017, for Taiwanese Application No. 105141022.

*Primary Examiner* — Gregg Cantelmo
(74) *Attorney, Agent, or Firm* — Birch, Stewart, Kolasch & Birch, LLP

(57) ABSTRACT

An electrolyte composition and a metal-ion battery employing the same are provided. The electrolyte composition includes a metal chloride, a chlorine-containing ionic liquid, and an additive, wherein the additive has a structure represented by Formula (I)

$$[M]_i[(A(SO_2C_xF_{2x+1})_y)^{b-}]_j \qquad \text{Formula (I)},$$

wherein M can be imidazolium cation, ammonium cation, azaannulenium cation, . . . etc., wherein M has a valence of a; a can be 1, 2, or 3; A can be N, O, Si, or C; x can be 1, 2, 3, 4, 5, or 6; y can be 1, 2, or 3; b can
(Continued)

be 1, 2, or 3; i can be 1, 2, or 3; j can be 1, 2, or 3; a/b=j/i; and when y is 2 or 3, the $(SO_2C_xF_{2x+1})$ moieties are the same or different.

18 Claims, 11 Drawing Sheets

(51) Int. Cl.
  *H01M 4/62* (2006.01)
  *H01M 12/08* (2006.01)
  *H01M 10/056* (2010.01)
  *H01M 10/0563* (2010.01)
  *H01M 10/0567* (2010.01)

(52) U.S. Cl.
  CPC ............. *H01M 4/582* (2013.01); *H01M 4/62* (2013.01); *H01M 10/0563* (2013.01); *H01M 10/0567* (2013.01); *H01M 12/08* (2013.01); *H01M 2300/0057* (2013.01); *Y02E 60/128* (2013.01)

(56) References Cited

U.S. PATENT DOCUMENTS

| | | | |
|---|---|---|---|
| 9,249,353 | B2 | 2/2016 | Posset et al. |
| 9,290,524 | B2 | 3/2016 | Zhang et al. |
| 2005/0271939 | A1 | 12/2005 | Xu et al. |
| 2006/0264642 | A1* | 11/2006 | Wasserscheid ...... B01J 31/0224 546/347 |
| 2012/0082905 | A1* | 4/2012 | Brown .................. H01M 4/463 429/338 |
| 2014/0242457 | A1* | 8/2014 | Archer .................. H01M 10/05 429/188 |
| 2016/0141727 | A1 | 5/2016 | Young et al. |

FOREIGN PATENT DOCUMENTS

| | | |
|---|---|---|
| JP | 2016-69388 A | 5/2016 |
| TW | 201543733 A | 11/2015 |
| WO | WO 2014/116082 A1 | 7/2014 |

* cited by examiner

ELECTROLYTE COMPOSITION AND METAL-ION BATTERY EMPLOYING THE SAME

CROSS REFERENCE TO RELATED APPLICATIONS

This application claims the benefit of U.S. Provisional Application No. 62/349,990, filed on Jun. 14, 2016, which is hereby incorporated herein by reference.

The application is based on, and claims priority from, Taiwan Application Serial Number 105141022, filed on Dec. 12, 2016, the disclosure of which is hereby incorporated by reference herein in its entirety.

TECHNICAL FIELD

The technical field relates to an electrolyte composition and a metal-ion battery.

BACKGROUND

Aluminum is the most abundant metal on earth, and electronic devices that are based on aluminum have the advantage of being inexpensive to produce. An aluminum-based redox couple involves three electron transfers during electrochemical charge/discharge reactions, and when applied in an energy storage device, it could provide a greater energy storage capacity. Furthermore, aluminum has low flammability and low electronic redox properties, such that an aluminum-ion battery might offer significant safety improvements.

However, the electrolyte composition employed in traditional metal-ion batteries absorbs moisture easily, resulting in deliquescence. Therefore, the packaging process of the metal-ion battery should be performed under strict conditions (an environment with low moisture and a low oxygen content), resulting in the yield of the battery being limited.

Therefore, the industry needs a novel electrolyte composition to overcome the problems mentioned above.

SUMMARY

According to an embodiment of the disclosure, the disclosure provides an electrolyte composition that includes a metal chloride, a chlorine-containing ionic liquid, and an additive, wherein the additive has a structure presented by Formula (I)

$[M]_i[(A(SO_2C_xF_{2x+1})_y)^{b-}]_j$  Formula (I), wherein M can be ammonium cation, azaannulenium cation, azathiazolium cation, benzimidazolium cation, benzofuranium cation, benzotriazolium cation, borolium cation, cholinium cation, cinnolinium cation, diazabicyclodecenium cation, diazabicyclononenium cation, diazabicyclo-undecenium cation, dithiazolium cation, furanium cation, guanidinium cation, imidazolium cation, indazolium cation, indolinium cation, indolium cation, morpholinium cation, oxaborolium cation, oxaphospholium cation, oxazinium cation, oxazolium cation, iso-oxazolium cation, oxathiazolium cation, pentazolium cation, phospholium cation, phosphonium cation, phthalazinium cation, piperazinium cation, piperidinium cation, pyranium cation, pyrazinium cation, pyrazolium cation, pyridazinium cation, pyridinium cation, pyrimidinium cation, pyrrolidinium cation, pyrrolium cation, quinazolinium cation, quinolinium cation, iso-quinolinium cation, quinoxalinium cation, selenozolium cation, sulfonium cation, tetrazolium cation, iso-thiadiazolium cation, thiazinium cation, thiazolium cation, thiophenium cation, thiuronium cation, triazadecenium cation, triazinium cation, triazolium cation, iso-triazolium cation, or uronium cation, wherein M can have a valence of a; a can be 1, 2, or 3; A can be N, O, Si, or C; x can be 1, 2, 3, 4, 5, or 6; y can be 1, 2, or 3; b can be 1, 2, or 3; i can be 1, 2, or 3; j can be 1, 2, or 3; a/b=j/i; and when y is 2 or 3, the $(SO_2C_xF_{2x+1})$ moieties can be the same or different.

According to an embodiment of the disclosure, the disclosure also provides a metal-ion battery including a positive electrode, a separator, a negative electrode, and the aforementioned electrolyte. Wherein the positive electrode and the negative electrode are separated from each other by the separator, and the electrolyte is disposed between the positive electrode and the negative electrode.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
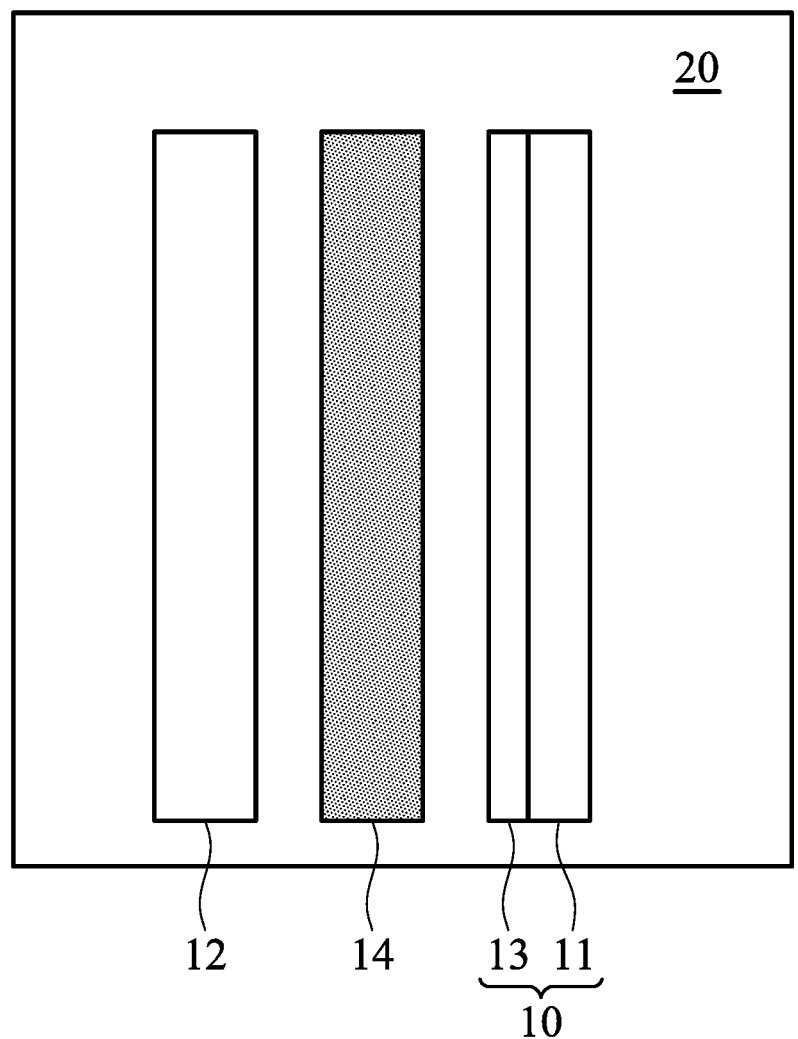
FIG. 1 is a schematic view of the metal-ion battery according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details.

The disclosure provides an electrolyte composition and a metal-ion battery employing the same. According to embodiments of the disclosure, in addition to the metal chloride and the chlorine-containing ionic liquid, the electrolyte composition further includes an additive with a specific amount. The additive may lower the and enhance the hydrolysis resistance of the electrolyte composition to achieve improvements of the water/air adaptability and life cycle of the metal-ion battery.

According to embodiments of the disclosure, the electrolyte composition can include a metal chloride, a chlorine-containing ionic liquid, and an additive, wherein the additive can be the compound having a structure represented by Formula (I)

$[M]_i[(A(SO_2C_xF_{2x+1})_y)^{b-}]_j$    Formula (I), wherein M can be ammonium cation, azaannulenium cation, azathiazolium cation, benzimidazolium cation, benzofuranium cation, benzotriazolium cation, borolium cation, cholinium cation, cinnolinium cation, diazabicyclodecenium cation, diazabicyclononenium cation, diazabicyclo-undecenium cation, dithiazolium cation, furanium cation, guanidinium cation, imidazolium cation, indazolium cation, indolinium cation, indolium cation, morpholinium cation, oxaborolium cation, oxaphospholium cation, oxazinium cation, oxazolium cation, iso-oxazolium cation, oxathiazolium cation, pentazolium cation, phospholium cation, phosphonium cation, phthalazinium cation, piperazinium cation, piperidinium cation, pyranium cation, pyrazinium cation, pyrazolium cation, pyridazinium cation, pyridinium cation, pyrimidinium cation, pyrrolidinium cation, pyrrolium cation, quinazolinium cation, quinolinium cation, iso-quinolinium cation, quinoxalinium cation, selenozolium cation, sulfonium cation, tetrazolium cation, iso-thiadiazolium cation, thiazinium cation, thiazolium cation, thiophenium cation, thiuronium cation, triazadecenium cation, triazinium cation, triazolium cation, iso-triazolium cation, or uronium cation, wherein M can have a valence of a; a can be 1, 2, or 3; A can be N, O, Si, or C; x can be 1, 2, 3, 4, 5, or 6; y can be 1, 2, or 3; b can be 1, 2, or 3; i can be 1, 2, or 3; j can be 1, 2, or 3; a/b=j/i; and when y is 2 or 3, the $(SO_2C_xF_{2x+1})$ moieties can be the same or different.

According to embodiments of the disclosure, the additive can be the having a structure represented by Formula (II)

$[M]_i[(OSO_2C_xF_{2x+1})^-]_j$    Formula (II), wherein M can be ammonium cation, azaannulenium cation, azathiazolium cation, benzimidazolium cation, benzofuranium cation, benzotriazolium cation, borolium cation, cholinium cation, cinnolinium cation, diazabicyclodecenium cation, diazabicyclononenium cation, diazabicyclo-undecenium cation, dithiazolium cation, furanium cation, guanidinium cation, imidazolium cation, indazolium cation, indolinium cation, indolium cation, morpholinium cation, oxaborolium cation, oxaphospholium cation, oxazinium cation, oxazolium cation, iso-oxazolium cation, oxathiazolium cation, pentazolium cation, phospholium cation, phosphonium cation, phthalazinium cation, piperazinium cation, piperidinium cation, pyranium cation, pyrazinium cation, pyrazolium cation, pyridazinium cation, pyridinium cation, pyrimidinium cation, pyrrolidinium cation, pyrrolium cation, quinazolinium cation, quinolinium cation, iso-quinolinium cation, quinoxalinium cation, selenozolium cation, sulfonium cation, tetrazolium cation, iso-thiadiazolium cation, thiazinium cation, thiazolium cation, thiophenium cation, thiuronium cation, triazadecenium cation, triazinium cation, triazolium cation, iso-triazolium cation, or uronium cation, wherein M can have a valence of a; a can be 1, 2, or 3; x can be 1, 2, 3, 4, 5, or 6; i can be 1, 2, or 3; j can be 1, 2, or 3; and, a=j/i.

According to embodiments of the disclosure, the additive can be the compound having a structure represented by Formula (III)

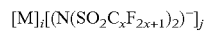

$[M]_i[(N(SO_2C_xF_{2x+1})_2)^-]_j$    Formula (III), wherein M can be ammonium cation, azaannulenium cation, azathiazolium cation, benzimidazolium cation, benzofuranium cation, benzotriazolium cation, borolium cation, cholinium cation, cinnolinium cation, diazabicyclodecenium cation, cation, diazabicyclo-undecenium cation, dithiazolium cation, furanium cation, guanidinium cation, imidazolium cation, indazolium cation, indolinium cation, indolium cation, morpholinium cation, oxaborolium cation, oxaphospholium cation, oxazinium cation, oxazolium cation, iso-oxazolium cation, oxathiazolium cation, pentazolium cation, phospholium cation, phosphonium cation, phthalazinium cation, piperazinium cation, piperidinium cation, pyranium cation, pyrazinium cation, pyrazolium cation, pyridazinium cation, pyridinium cation, pyrimidinium cation, pyrrolidinium cation, pyrrolium cation, quinazolinium cation, quinolinium cation, iso-quinolinium cation, quinoxalinium cation, selenozolium cation, sulfonium cation, tetrazolium cation, iso-thiadiazolium cation, thiazinium cation, thiazolium cation, thiophenium cation, thiuronium cation, triazadecenium cation, triazinium cation, triazolium cation, iso-triazolium cation, or uronium cation, wherein M can have a valence of a; a can be 1, 2, or 3; x can be 1, 2, 3, 4, 5, or 6; i can be 1, 2, or 3; j can be 1, 2, or 3; and, a=j/i.

According to some embodiments of the disclosure, the additive can be 1-ethyl-3-methylimidazolium triflate ([EMI$^+$][OTf$^-$]), 1-ethyl-3-methylimidazolium-bis(trifluoromethylsulfonyl)imide ([EMI$^+$][TFSI$^-$]), 1-butyl-3-methylimidazolium triflate ([BMI$^+$][OTf$^-$]), 1-butyl-3-methylimidazolium-bis(trifluoromethylsulfonyl)imide ([BMI$^+$][TFSI$^-$]), or a combination thereof.

According to embodiments of the disclosure, the metal chloride can be aluminum chloride, iron chloride, zinc chloride, copper chloride, manganese chloride, chromium chloride, or a combination thereof.

According to embodiments of the disclosure, the chlorine-containing ionic liquid can include ammonium chloride, azaannulenium chloride, azathiazolium chloride, benzimidazolium chloride, benzofuranium chloride, benzotriazolium chloride, borolium cholinium chloride, cinnolinium chloride, diazabicyclodecenium chloride, diazabicyclononenium chloride, diazabicyclo-undecenium chloride, dithiazolium chloride, furanium chloride, guanidinium chloride, imidazolium chloride, indazolium chloride, indolinium chloride, indolium chloride, morpholinium chloride, oxaborolium chloride, oxaphospholium chloride, oxazinium chloride, oxazolium chloride, iso-oxazolium chloride, oxathiazolium chloride, pentazolium chloride, phospholium chloride, phosphonium chloride, phthalazinium chloride, piperazinium chloride, piperidinium chloride, pyranium chloride, pyrazinium chloride, pyrazolium chloride, pyridazinium chloride, pyridinium chloride, pyrimidinium chloride, pyrrolidinium chloride, pyrrolium chloride, quinazolinium chloride, quinolinium chloride, iso-quinolinium chloride, quinoxalinium chloride, selenozolium chloride, sulfonium chloride, tetrazolium chloride, iso-thiadiazolium chloride, thiazinium chloride, thiazolium chloride, thiophenium chloride, thiuronium chloride, triazadecenium chloride, triazinium chloride, triazolium chloride, iso-triazolium chloride, or uronium chloride.

According to embodiments of the disclosure, the chlorine-containing ionic liquid can include ammonium chloride (e.g., alkylammonium chloride), azaannulenium chloride (e.g., alkylazaannulenium chloride), azathiazolium chloride (e.g., alkylazathiazolium chloride), benzimidazolium chloride (e.g., alkylbenzimidazolium chloride), benzofuranium chloride (e.g., alkylbenzofuranium chloride), benzotriazolium chloride (e.g., alkylbenzotriazolium chloride), borolium chloride (e.g., alkylborolium chloride), cholinium chloride (e.g., alkylcholinium chloride), cinnolinium chloride (e.g., alkylcinnolinium chloride), diazabicyclodecenium chloride (e.g., alkyldiazabicyclodecenium chloride), diazabicyclononenium chloride (e.g., alkyldiazabicyclononenium chloride), diazabicyclo-undecenium chloride (e.g., alkyldiazabicyclo-undecenium chloride), dithiazolium chloride (e.g., alkyldithiazolium furanium chloride (e.g., alkylfuranium chloride), guanidinium chloride (e.g., alkylguanidinium chloride), imidazolium chloride (e.g., alkylimidazolium chloride), indazolium chloride (e.g., alkylindazolium chloride), indolinium chloride (e.g., alkylindolinium chloride), indolium chloride (e.g., alkylindolium chloride), morpholinium chloride (e.g., alkylmorpholinium chloride), oxaborolium chloride (e.g., alkyloxaborolium chloride), oxaphospholium chloride (e.g., alkyloxaphospholium chloride), oxazinium chloride (e.g., alkyloxazinium chloride), oxazolium chloride (e.g., alkyloxazolium chloride), iso-oxazolium chloride (e.g., iso-alkyloxazolium chloride), oxathiazolium chloride (e.g., alkyloxathiazolium chloride), pentazolium chloride (e.g., alkylpentazolium chloride), phospholium chloride (e.g., alkylphospholium chloride), phosphonium chloride (e.g., alkylphosphonium chloride), phthalazinium chloride (e.g., alkylphthalazinium chloride), piperazinium chloride (e.g., alkylpiperazinium chloride), piperidinium chloride (e.g., alkylpiperidinium chloride), pyranium chloride (e.g., alkylpyranium chloride), pyrazinium chloride (e.g., alkylpyrazinium chloride), pyrazolium chloride (e.g., alkylpyrazolium chloride), pyridazinium chloride (e.g., alkylpyridazinium chloride), pyridinium chloride (e.g., alkylpyridinium chloride), pyrimidinium chloride (e.g., alkylpyrimidinium chloride), pyrrolidinium chloride (e.g., alkylpyrrolidinium chloride), pyrrolium chloride (e.g., alkylpyrrolium chloride), quinazolinium chloride (e.g., alkylquinazolinium chloride), quinolinium chloride (e.g., alkylquinolinium chloride), iso-quinolinium chloride (e.g., iso-alkylquinolinium chloride), quinoxalinium chloride (e.g., alkylquinoxalinium chloride), selenozolium chloride (e.g., alkylselenozolium chloride), sulfonium chloride (e.g., alkylsulfonium chloride), tetrazolium chloride (e.g., alkyltetrazolium chloride), iso-thiadiazolium chloride (e.g., iso-alkylthiadiazolium chloride), thiazinium chloride (e.g., alkylthiazinium chloride), thiazolium chloride (e.g., alkylthiazolium chloride), thiophenium chloride (e.g., chloride), thiuronium chloride (e.g., alkylthiuronium chloride), triazadecenium chloride (e.g., alkyltriazadecenium chloride), triazinium chloride (e.g., alkyltriazinium chloride), triazolium chloride (e.g., alkyltriazolium chloride), iso-triazolium chloride (e.g., iso-alkyltriazolium chloride), uronium chloride (e.g., alkyluronium chloride), or a combination thereof.

According to some embodiments of the disclosure, the chlorine-containing ionic liquid is methylimidazolium chloride, 1-ethyl-3-methylimidazolium chloride, 1-butyl-3-methylimidazolium chloride, cholinium chloride, or a combination thereof.

According to embodiments of the disclosure, the molar ratio of the metal chloride to the chlorine-containing ionic liquid is at least about 1.1, or at least about 1.2, such as from about 1.1 to 2.05. For example, the molar ratio of the metal chloride to the chlorine-containing ionic liquid can be about 1.1, 1.2, 1.3, 1.4, 1.5, 1.6, 1.7, 1.8, 1.9, or 2.0. According to embodiments of the disclosure, the amount of additive can be from 1 wt % to 10 wt %, based on the total weight of the metal chloride and the chlorine-containing ionic liquid. When the amount of additive is too low, the hygroscopicity of the electrolyte composition would not be reduced efficiently and the hydrolysis resistance of the electrolyte composition would not be enhanced effectively, resulting in the electrolyte composition having poor water/air adaptability. When the amount of additive is too large, the viscosity of the electrolyte composition would be increased, resulting in the electrolyte composition not being apt to infiltrate into the layered active material, reducing the total capacity of the battery.

According to embodiments of the disclosure, a metal-ion battery is also provided. FIG. 1 is a schematic view of the metal-ion battery 100 according to an embodiment of the disclosure. The metal-ion battery 100 can include a positive electrode 10, a negative electrode 12, and a separator 14, wherein the separator 14 can be disposed the positive electrode 10 and the negative electrode 12 to separate the negative electrode 12 and the positive electrode 10 from each other, preventing the positive electrode 10 from coming into direct contact with the negative electrode 12. The metal-ion battery 100 further includes the aforementioned electrolyte composition 20 disposed between the positive electrode and the negative electrode in the battery. Thus, the electrolyte composition 20 comes into contact with the positive electrode 10 and the negative electrode 12. The metal-ion battery can be a rechargeable secondary battery or it can be a primary battery.

According to embodiments of the disclosure, the positive electrode 10 can contain a current collector 11 and an active material 13 which is disposed on the current collector. According to embodiments of the disclosure, the positive electrode 10 can consist of the current collector 11 and the active material 13. According to embodiments of the disclosure, the current collector 11 can be conductive carbon substrate, such as carbon cloth, carbon felt, or carbon paper. The current collector 11 can be a metal material, for example a metal such as aluminum, nickel, copper, etc. In addition, the current collector 11 can be a composite of a carbon material and a metal. For example, the carbon content of the conductive carbon substrate is greater than 65 wt % and the conductive carbon substrate has a sheet resistance from about 1 mΩ·cm$^{-2}$ to 6 mΩ·cm$^{-2}$. The active material 13 can be layered carbon material, vanadium oxide, metal sulfide, or a combination thereof. According to embodiments of the disclosure, the layered carbon material is graphite, carbon nanotube, graphene, or a combination thereof.

According to embodiments of the disclosure, the layered carbon material can be intercalated carbon material, such as graphite (e.g., natural graphite, artificial graphite, pyrolytic graphite, foamed graphite, flake graphite, or expanded graphite), graphene, carbon nanotube, or a combination thereof. The active material 13 can have the porosity a range from about 0.05 to 0.95, such as from about 0.3 and 0.9. In addition, according to embodiments of the disclosure, the active material 13 can develop directly above the current collector 11 (i.e. there is no other layer between the active layer and the current-collecting layer). Furthermore, the active material 13 can be affixed to the current-collecting layer 11 via an adhesive.

According to embodiments of the disclosure, the separator can be glass fibers, polyethylene (PE), polypropylene (PP), nonwoven fabric, wood fibers, poly(ether sulfones) (PES), ceramic fibers, or a combination thereof.

According to embodiments of the disclosure, the negative electrode 12 can be a metal or an alloy of the metal. According to the embodiments of the disclosure, the metal can be copper, iron, aluminum, zinc, indium, nickel, tin, chromium, yttrium, titanium, manganese, or molybdenum. In addition, the negative electrode 12 can further contain a current collector (not shown), and the metal or the alloy of the metal is disposed on the current collector. According to embodiments of the disclosure, the metal or the alloy of the metal can be disposed directly on the current collector (i.e. there is no other layer between the active layer and the current-collecting layer). Furthermore, the active material 13 can be affixed to the current-collecting layer 11 via an adhesive. According to embodiments of the disclosure, the metal can have a reduction potential lower than that of aluminum, thereby solving the problem of the negative electrode corrosion of the metal-ion battery.

Below, exemplary embodiments will be described in detail so as to be easily realized by a person having ordinary knowledge in the art. The disclosure concept may be embodied in various forms without being limited to the exemplary embodiments set forth herein. Descriptions of well-known parts are omitted for clarity.

Example 1

1.4 mole of aluminum chloride and 1.0 mole of 1-ethyl-3-methylimidazolium chloride were mixed. The reactants were all transferred from a solid state to a liquid state since the reactants formed a melt at room temperature. Next, 1 wt % (based on the total weight of aluminum chloride and 1-ethyl-3-methylimidazolium chloride) of 1-ethyl-3-methylimidazolium triflate ([EMI$^+$][OTf$^-$]) was added into the mixture and then the mixture was stirred for 12 hours, obtaining Electrolyte composition (1).

Example 2

1.4 mole of aluminum chloride and 1.0 mole of 1-ethyl-3-methylimidazolium chloride were mixed. The reactants were all transferred from a solid state to a liquid state since the reactants formed a melt at room temperature. Next, 10 wt % (based on the total weight of aluminum chloride and 1-ethyl-3-methylimidazolium chloride) of 1-ethyl-3-methylimidazolium triflate ([EMI$^+$][OTf$^-$]) was added into the mixture and then the mixture was stirred for 12 hours, obtaining Electrolyte composition (2).

Example 3

1.4 mole of aluminum chloride and 1.0 mole of 1-ethyl-3-methylimidazolium chloride were mixed. The reactants were all transferred from a solid state to a liquid state since the reactants formed a melt at room temperature. Next, 1 wt % (based on the total weight of aluminum chloride and 1-ethyl-3-methylimidazolium chloride) of 1-ethyl-3-methylimidazolium-bis(trifluoromethylsulfonyl)imide ([EMI$^+$][TFSI$^-$]) was added into the mixture and then the mixture was stirred for 12 hours, obtaining Electrolyte composition (3).

Example 4

1.4 mole of aluminum chloride and 1.0 mole of 1-ethyl-3-methylimidazolium chloride were mixed. The reactants were all transferred from a solid state to a liquid state since the reactants were formed a melt at room temperature. Next, 10 wt % (based on the weight of aluminum chloride and 1-ethyl-3-methylimidazolium chloride) of 1-ethyl-3-methylimidazolium-bis(trifluoromethylsulfonyl)imide ([EMI$^+$][TFSI$^-$]) was added into the mixture and then the mixture was stirred for 12 hours, obtaining Electrolyte composition (4).

Comparative Example 1

1.4 mole of aluminum chloride and 1.0 mole of 1-ethyl-3-methylimidazolium chloride were mixed, which was absence of additive in the mixture. Next, the mixture was stirred for 12 hours, obtaining Electrolyte composition (5).

Water/Air Adaptability Test of Electrolyte Composition

Electrolyte compositions (1) to (5) were respectively placed into a humidity chamber with 60% relative humidity and 25° C. environment temperature. Next, the moisture content of Electrolyte compositions (1) to (5) was measured by Karl Fischer at $5^{th}$, $10^{th}$, $20^{th}$, and $30^{th}$ minutes. The results are shown in Table 1.

TABLE 1

| | moisture content (ppm) | | | | |
|---|---|---|---|---|---|
| | 0 min | 5 mins | 10 mins | 20 mins | 30 mins |
| Electrolyte composition (1) | 273 | 774 | 1227 | 2066 | 2147 |
| Electrolyte composition (2) | 158 | 424 | 570 | 1144 | 2035 |
| Electrolyte composition (3) | 261 | 620 | 1058 | 1152 | 2400 |
| Electrolyte composition (4) | 178 | 574 | 846 | 1137 | 1764 |
| Electrolyte composition (5) | 295 | 826 | 1197 | 2207 | 3089 |

As shown in Table 1, in comparison with Electrolyte composition (5), which is merely composed of aluminum and 1-ethyl-3-methylimidazolium, Electrolyte compositions (1) to (4) of the disclosure could reduce the water absorption rate of the electrolyte composition, and thereby a lower rate of increase of the moisture content of Electrolyte compositions (1) to (4) was observed. In addition, as shown in Table 1, the water absorption rate of the electrolyte composition could be reduced by increasing the amount of 1-ethyl-3-methylimidazolium triflate or 1-ethyl-3-methylimidazolium-bis(trifluoromethylsulfonyl)imide in the electrolyte composition.

Metal-Ion Battery

Comparative Example 2

First, Electrolyte composition (5) (prepared from Comparative Example 1) was placed into a humidity chamber with 60% relative humidity and 25° C. environment temperature for 30 minutes. Next, an aluminum foil (with a thickness of 0.025 mm, manufactured by Alfa Aesar) was cut to obtain an aluminum electrode. Next, the aluminum electrode, a separator (glass filter paper with 6 layers, ½ inch, sold by Whatman with trade No. 934-AH), and a graphite electrode (including an active material disposed on a current-collecting substrate, wherein the current-collecting substrate was carbon fiber paper and the active material was graphite) were placed in sequence and sealed within an aluminum plastic pouch, and Electrolyte composition (5) was injected into the aluminum plastic pouch, obtaining Metal-ion battery (1).

Figure 2:
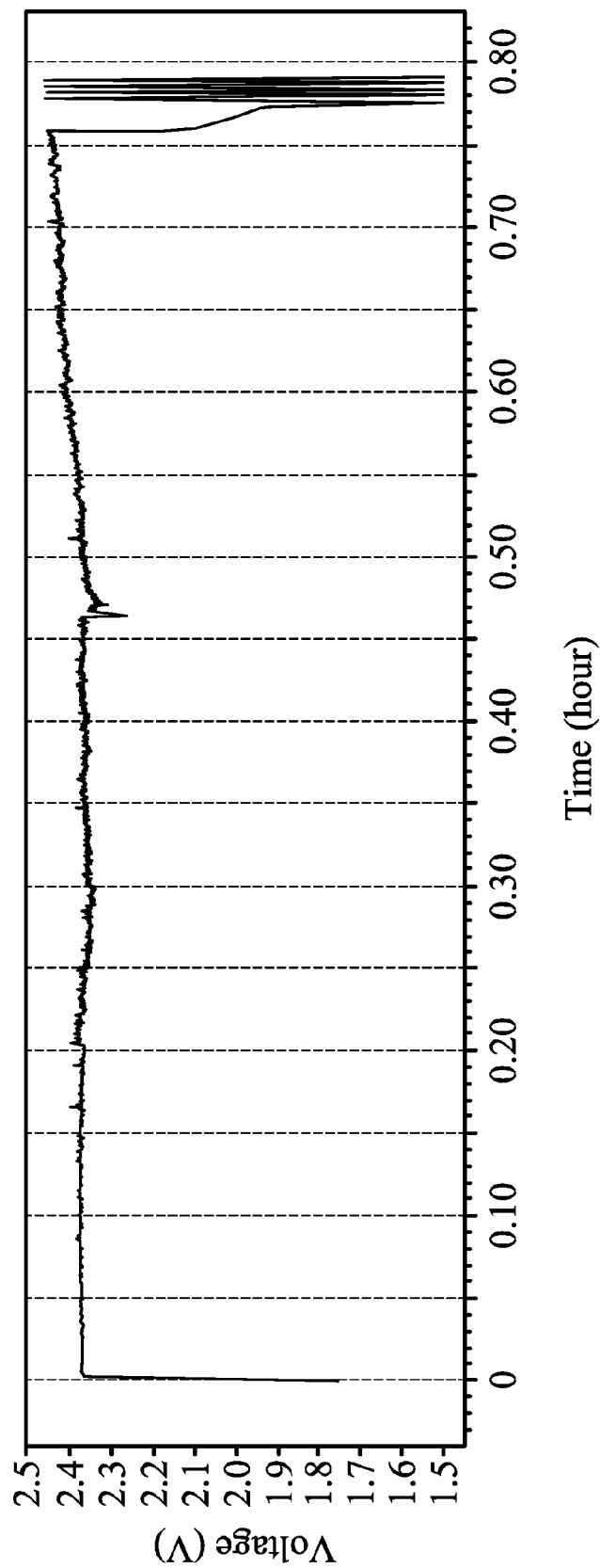
FIG. 2 is a graph showing the relationship between the charge/discharge voltage and time of Metal-ion battery (1) as disclosed in Comparative example 1 of the disclosure.
Figure 3:
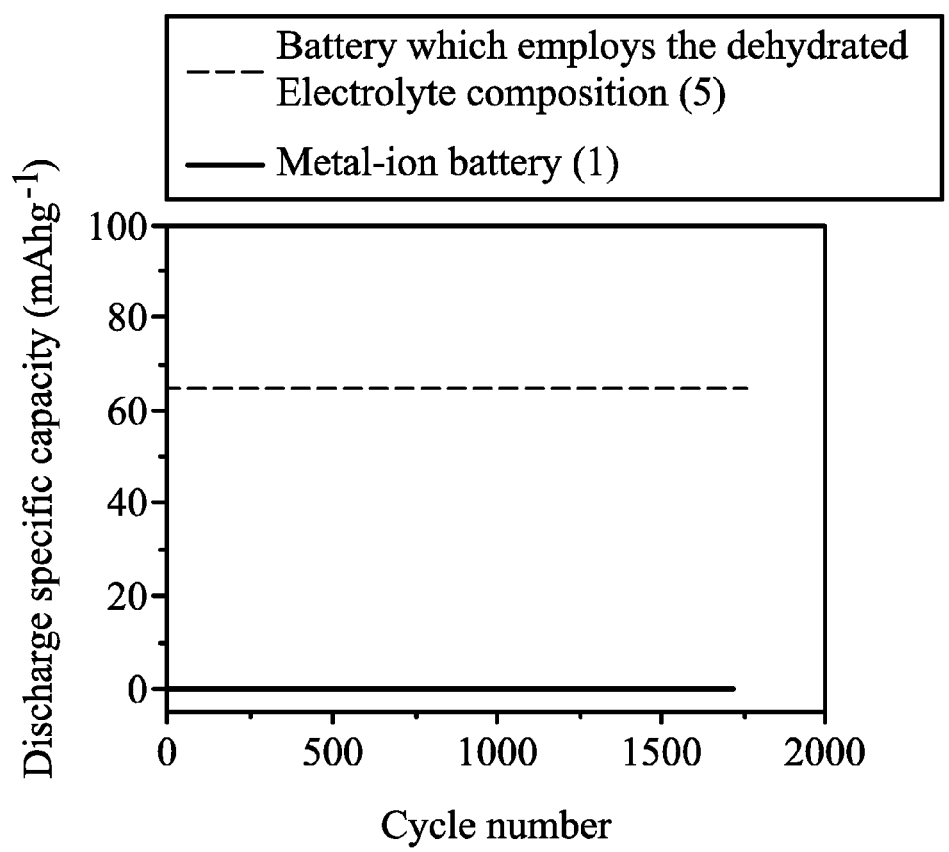
FIG. 3 is a graph showing the relationship between the specific discharge capacity and the charge/discharge cycles of Metal-ion battery (1) as disclosed in Comparative example 1 of the disclosure.

Next, Metal-ion battery (1) was activated with a current of 500 mAg$^{-1}$ for 30 cycles by a MTI battery analyzer (BST8-WA, Richmond). After the activating process, charge-discharge testing was performed with a current of 1000 mAg$^{-1}$. FIG. 2 is a graph showing the relationship between the charge/discharge voltage and time of Metal-ion battery (1) (first 5 charge-discharge cycles). As shown in FIG. 2, the time period in which the voltage of the Metal-ion battery (1) achieved 2.45V in the first charge-discharge cycle was 45 minutes, due to the higher moisture content of Electrolyte composition (5). FIG. 3 shows the charge-discharge capacity retention at a current density of about 1000 mAg$^{-1}$ of Metal-ion battery (1). As shown in FIG. 3, the charge-discharge characteristic of Metal-ion battery (1) was poor and the discharge capacity was extremely low (<1 mAg$^{-1}$). Therefore, Metal-ion battery (1) cannot achieve the performance of the battery which employs the dehydrated electrolyte (when Electrolyte composition (5) was dehydrated to with water content less than 300 ppm).

Example 5

First, Electrolyte composition (1) (prepared from Example 1) was placed into a humidity chamber with 60% relative humidity and 25° C. environment temperature for 30 minutes. Next, an aluminum foil (with a thickness of 0.025 mm, manufactured by Alfa Aesar) was cut to obtain an aluminum electrode. Next, the aluminum electrode, a separator (glass filter paper with 6 layers, ½ inch, sold by Whatman with trade No. 934-AH), and a graphite electrode (including an active material disposed on a current-collecting substrate, wherein the current-collecting substrate was carbon fiber paper and the active material was graphite) were placed in sequence and sealed within an aluminum plastic pouch, and Electrolyte composition (1) was injected into the aluminum plastic pouch, obtaining Metal-ion battery (2).

Figure 4:
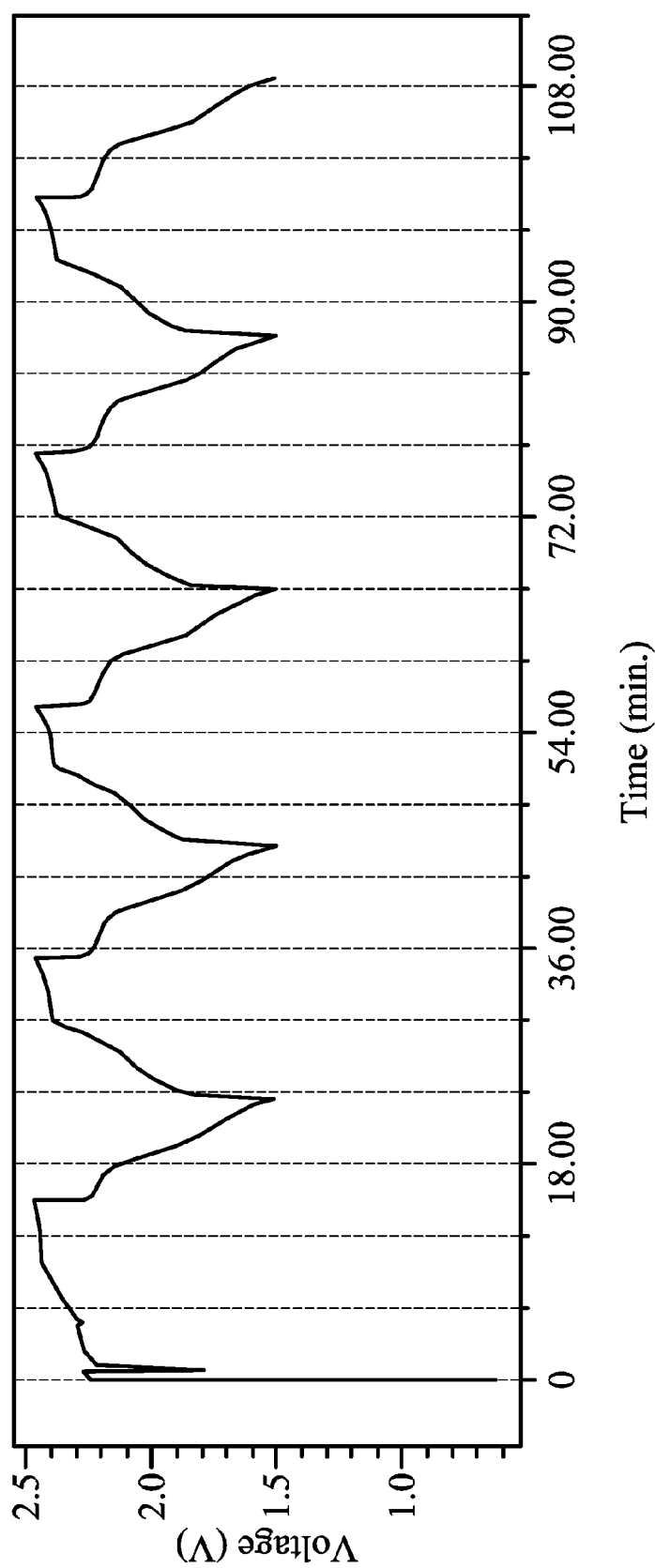
FIG. 4 is a graph showing the relationship between the charge/discharge voltage and time of Metal-ion battery (2) as disclosed in Example 5 of the disclosure.
Figure 5:
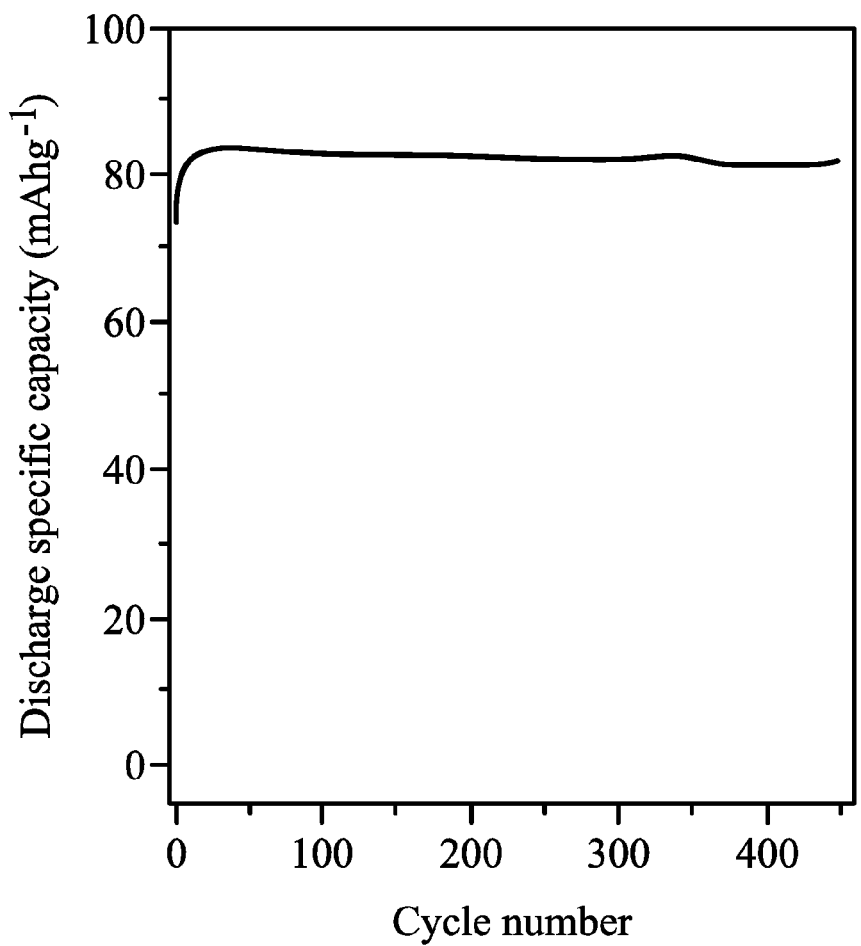
FIG. 5 is a graph showing the relationship between the specific discharge capacity and the charge/discharge cycles of Metal-ion battery (2) as disclosed in Example 5 of the disclosure.

Next, Metal-ion battery (2) was activated with a current of 500 mAg$^{-1}$ for 30 cycles by a MTI battery analyzer (BST8-WA, Richmond). After the activating process, the charge-discharge testing was performed with a current of 1000 mAg$^{-1}$. FIG. 4 is a showing the relationship between the charge/discharge voltage and time of Metal-ion battery (2) (first 5 charge-discharge cycles). As shown in FIG. 4, the time period in which the voltage of the Metal-ion battery (2) achieved 2.45V in the first charge-discharge cycle was 15 minutes. In comparison with Comparative Example 1, this time period is shortened by 30 minutes. FIG. 5 shows the charge-discharge capacity retention at a current density of about 1000 mAg$^{-1}$ of Metal-ion battery (2). As shown in FIG. 5, Metal-ion battery (2) was functional, since Electrolyte composition (1) employed 1-ethyl-3-methylimidazolium triflate [EMI$^+$][OTf$^-$]) (as the additive), which could reduce the hygroscopicity of the electrolyte composition. According to FIG. 5, Metal-ion battery (2) had a discharge capacity of about 83 mAhg$^{-1}$ and a life cycle of more than 400 cycles.

Example 6

First, Electrolyte composition (2) (prepared from Example 2) was placed into a humidity chamber with 60% relative humidity and 25° C. environment temperature for 30 minutes. Next, an aluminum foil (with a thickness of 0.025 mm, manufactured by Alfa Aesar) was cut to obtain an aluminum electrode. Next, the aluminum electrode, a separator (glass filter paper with 6 layers, ½ inch, sold by Whatman with trade No. 934-AH), and a graphite electrode (including an active material disposed on a current-collecting substrate, wherein the current-collecting substrate was carbon fiber paper and the active material was graphite) were placed in sequence and sealed within an aluminum plastic pouch, and Electrolyte composition (2) was injected into the aluminum plastic pouch, obtaining Metal-ion battery (3).

Figure 6:
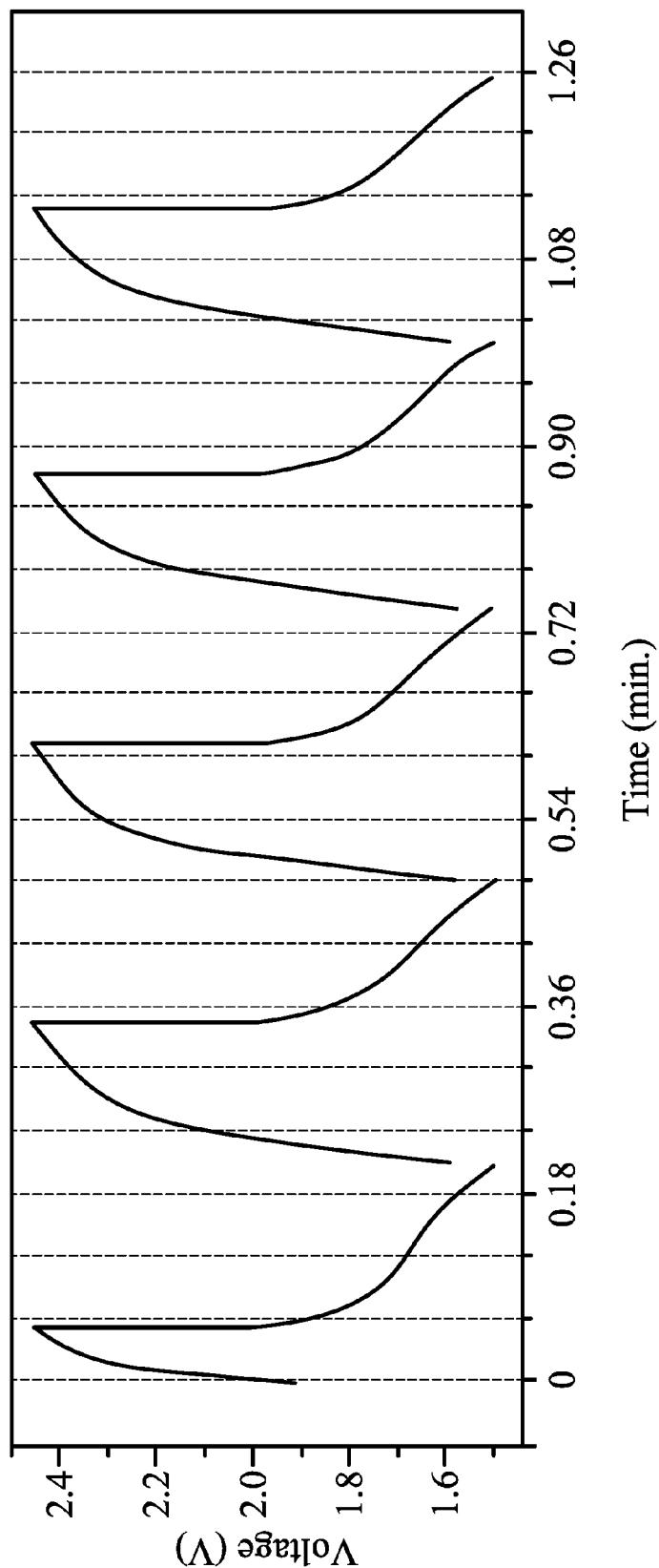
FIG. 6 is a graph showing the relationship between the charge/discharge voltage and time of Metal-ion battery (3) as disclosed in Example 6 of the disclosure.
Figure 7:
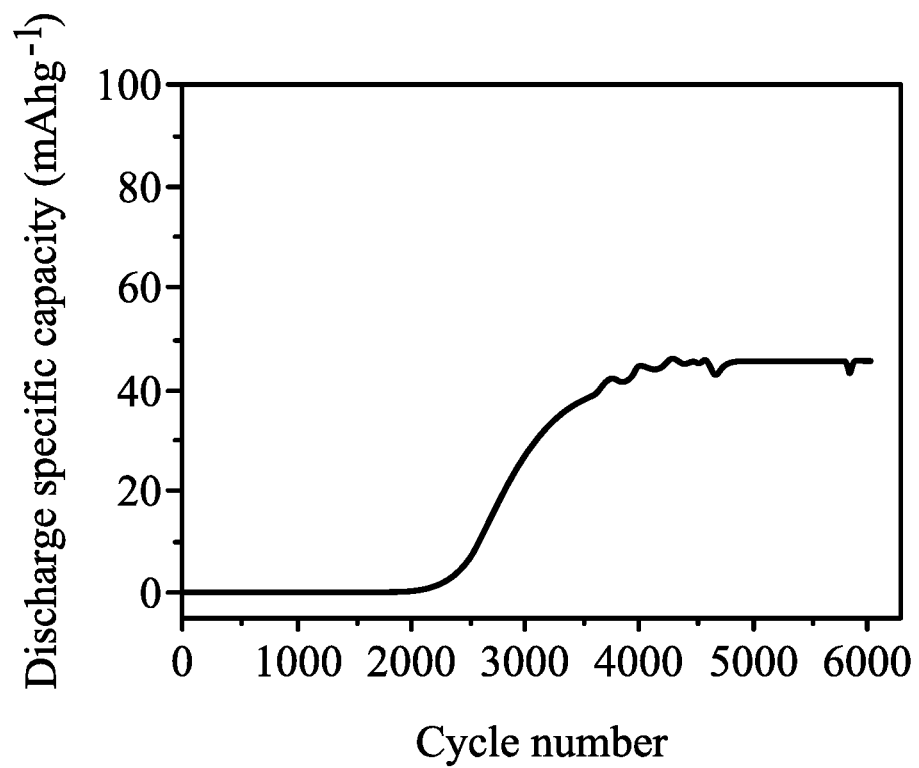
FIG. 7 is a graph showing the relationship between the specific discharge capacity and the charge/discharge cycles of Metal-ion battery (3) as disclosed in Example 6 of the disclosure.

Next, Metal-ion battery (3) was activated with a current of 500 mAg$^{-1}$ for 30 cycles by a MTI battery analyzer (BST8-WA, Richmond). After the activating process, the charge-discharge testing was performed with a current of 1000 mAg$^{-1}$. FIG. 6 is a graph showing the relationship between the charge/discharge voltage and time of Metal-battery (3) (first 5 charge-discharge cycles). As shown in FIG. 6, Metal-ion battery (3) was almost not affected by water at the first charge-discharge cycle. FIG. 7 shows the charge-discharge capacity retention at a current density of about 1000 mAg$^{-1}$ of Metal-ion battery (3). As shown in FIG. 7, Metal-ion battery (3) had a discharge capacity of about 45 mAhg$^{-1}$ and a life cycle of more than 6000 cycles.

Example 7

First, Electrolyte composition (3) (prepared from Example 3) was placed into a humidity chamber with 60% relative humidity and 25° C. environment temperature for 30 minutes. Next, an aluminum foil (with a thickness of 0.025 mm, manufactured by Alfa Aesar) was cut to obtain an aluminum electrode. Next, the aluminum electrode, a separator (glass filter paper with 6 layers, ½ inch, sold by Whatman with trade No. 934-AH), and a graphite electrode (including an active material disposed on a current-collecting substrate, wherein the current-collecting substrate was carbon fiber paper and the active material was graphite) were placed in sequence and sealed within an aluminum plastic pouch, and Electrolyte composition (3) was injected into the aluminum plastic pouch, obtaining Metal-ion battery (4).

Figure 8:
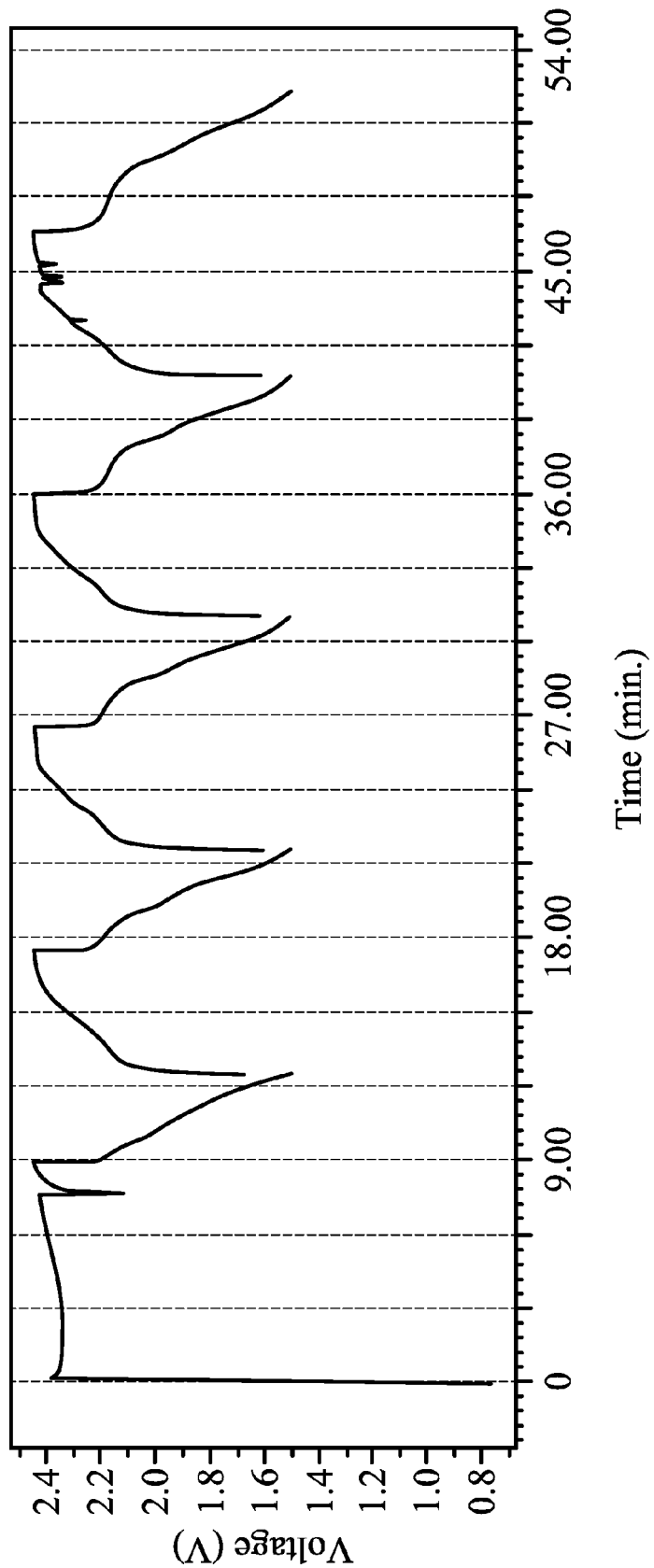
FIG. 8 is a graph showing the relationship between the charge/discharge voltage and time of Metal-ion battery (4) as disclosed in Example 7 of the disclosure.
Figure 9:
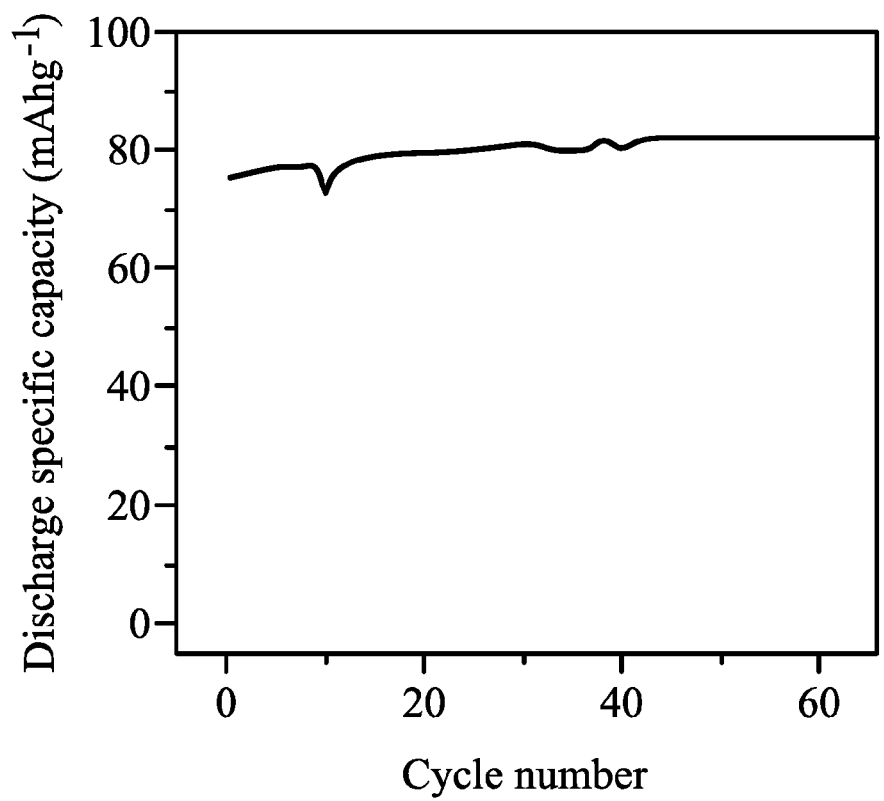
FIG. 9 is a graph showing the relationship between the specific discharge capacity and the charge/discharge cycles of Metal-ion battery (4) as disclosed in Example 7 of the disclosure.

Next, Metal-ion battery (4) was activated with a current of 500 mAg$^{-1}$ for 30 cycles by a MTI battery analyzer (BST8-WA, Richmond). After the activating process, the charge-discharge testing was performed with a current of 1000 mAg$^{-1}$. FIG. 8 is a graph showing the relationship between the charge/discharge voltage and time of Metal-ion battery (4) (first 5 charge-discharge cycles). As shown in FIG. 8, the time period in which the voltage of the Metal-ion battery (4) achieved 2.45V in the first charge-discharge cycle was 9 minutes. In comparison with Comparative Example 1, this time period is shortened by 36 minutes. FIG. 9 shows the charge-discharge capacity retention at a current density of about 1000 mAg$^{-1}$ of Metal-ion battery (4). As shown in FIG. 9, battery (4) had a discharge capacity of about 80 mAhg$^{-1}$ and a life cycle of more than 60 cycles.

Example 8

First, Electrolyte composition (4) (prepared from Example 4) was placed into a humidity chamber with 60% relative humidity and 25° C. environment temperature for 30 minutes. Next, an aluminum foil (with a thickness of 0.025 mm, manufactured by Alfa Aesar) was cut to obtain an aluminum electrode. Next, the aluminum electrode, a separator (glass filter paper with 6 layers, ½ inch, sold by Whatman with trade No. 934-AH), and a graphite electrode (including an active material disposed on a current-collecting substrate, wherein the current-collecting substrate was carbon fiber paper and the active material was graphite) were placed in sequence and sealed within an aluminum plastic pouch, and Electrolyte composition (4) was injected into the aluminum plastic pouch, obtaining Metal-ion battery (5).

Figure 10:
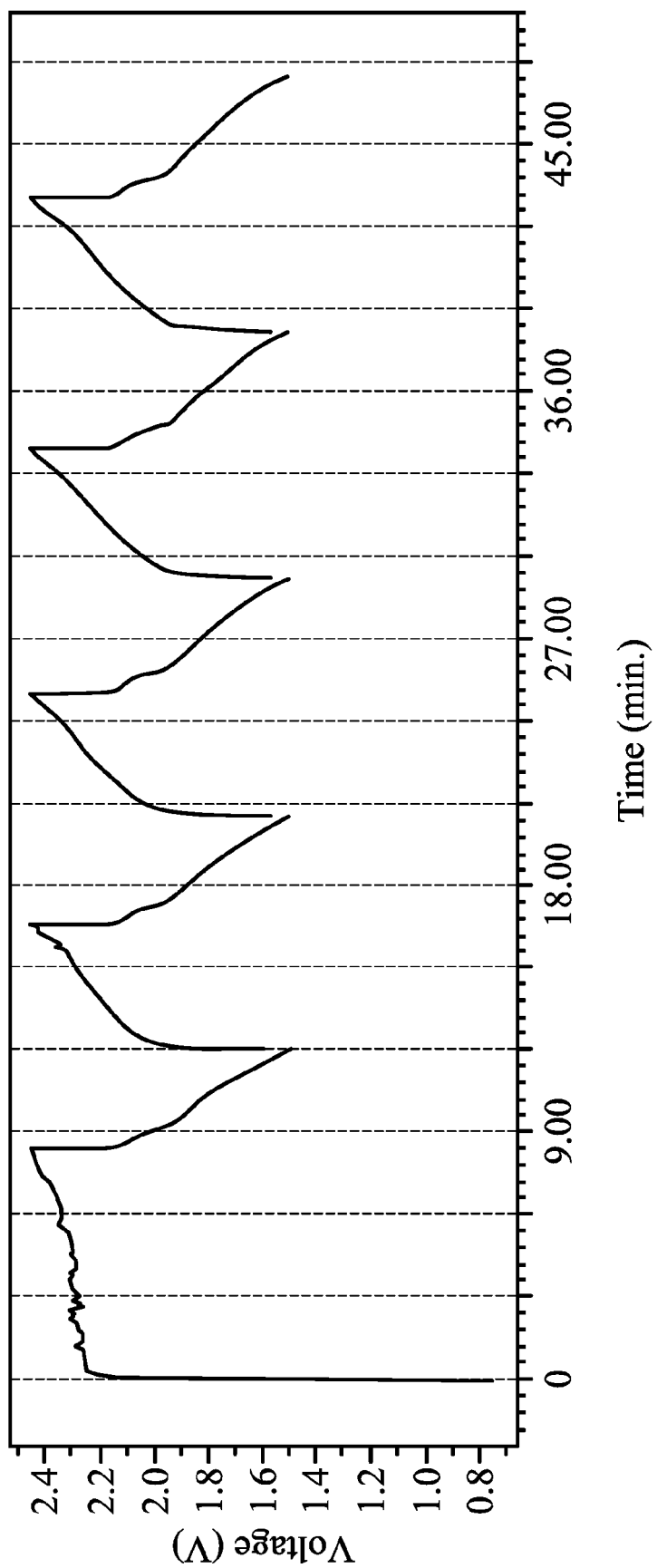
FIG. 10 is a graph showing the relationship between the charge/discharge voltage and time of Metal-ion battery (5) as disclosed in Example 8 of the disclosure.
Figure 11:
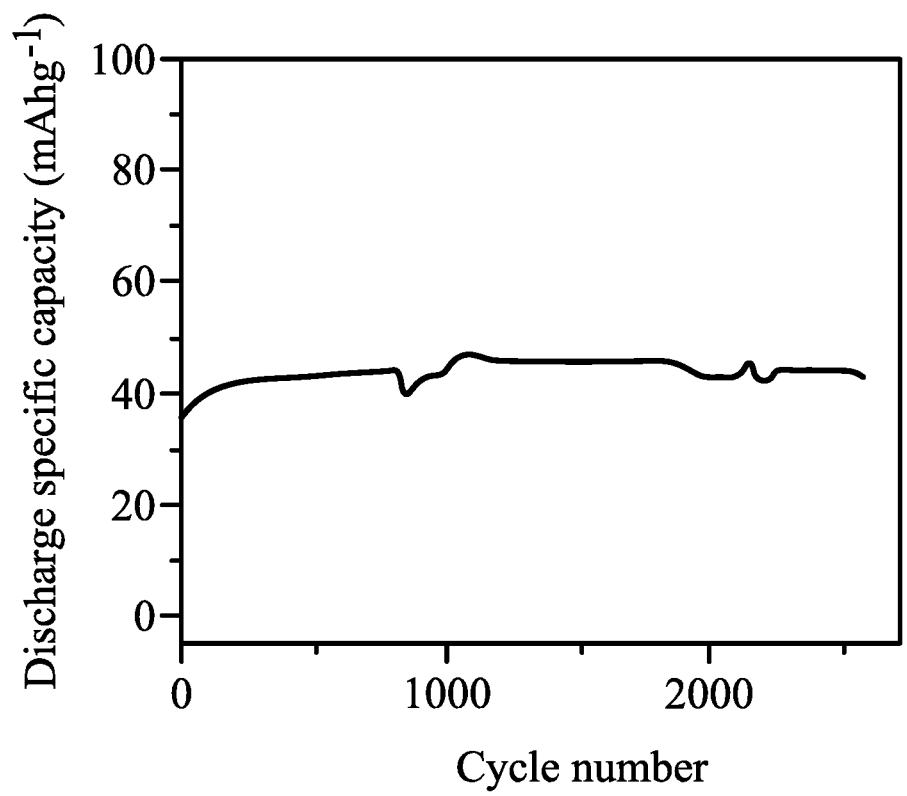
FIG. 11 is a graph showing the relationship between the specific discharge capacity and the charge/discharge cycles of Metal-ion battery (5) as disclosed in Example 8 of the disclosure.

Next, Metal-ion battery (5) was activated with a current of 500 mAg$^{-1}$ for 30 cycles by a MTI battery analyzer (BST8-WA, Richmond). After the activating process, the charge-discharge testing was performed with a current of 1000 mAg$^{-1}$. FIG. 10 is a graph showing the relationship between the charge/discharge voltage and time of Metal-ion battery (5) (first 5 charge-discharge cycles). As shown in FIG. 10, the time period in which the voltage of the Metal-ion battery (2) achieved 2.45V in the first charge-discharge cycle was 9 minutes. FIG. 11 shows the charge-discharge capacity retention at a current density of about 1000 mAg$^1$ of Metal-ion battery (5). As shown in FIG. 11, Metal-ion battery (4) had a discharge capacity of about 45 mAhg$^{-1}$ and a life cycle of more than 2500 cycles.

Consequently, in addition to the metal chloride and the chlorine-containing ionic liquid, the electrolyte composition further includes a specific amount of an additive, reduces the hygroscopicity and enhances the hydrolysis resistance, thereby improving the water/air adaptability of the electrolyte composition. Therefore, the stability and life cycle of the metal-ion battery can be improved.

It will be clear that various modifications and variations can be made to the disclosed methods and materials. It is intended that the specification and examples be considered as exemplary only, with the true scope of the disclosure being indicated by the following claims and their equivalents.

What is claimed is:

1. An electrolyte composition, comprising:
   a metal chloride;
   a chlorine-containing ionic liquid; and
   an additive, wherein the additive has a structure represented by Formula (I)

   $[M]_i[(A(SO_2C_xF_{2x+1})_y)^{b-}]_j$      Formula (I), wherein M is ammonium cation, azaannulenium cation, azathiazolium cation, benzimidazolium cation, benzofuranium cation, benzotriazolium cation, borolium cation, cholinium cation, cinnolinium cation, diazabicyclodecenium cation, diazabicyclononenium cation, diazabicyclo-undecenium cation, dithiazolium cation, furanium cation, guanidinium cation, imidazolium cation, indazolium cation, indolinium cation, indolium cation, morpholinium cation, oxaborolium cation, oxaphospholium cation, oxazinium cation, oxazolium cation, iso-oxazolium cation, oxathiazolium cation, pentazolium cation, phospholium cation, phosphonium cation, phthalazinium cation, piperazinium cation, piperidinium cation, pyranium cation, pyrazinium cation, pyrazolium cation, pyridazinium cation, pyridinium cation, pyrimidinium cation, pyrrolidinium cation, pyrrolium cation, quinazolinium cation, quinolinium cation, iso-quinolinium cation, quinoxalinium cation, selenozolium cation, sulfonium cation, tetrazolium cation, iso-thiadiazolium cation, thiazinium cation, thiazolium cation, thiophenium cation, thiuronium cation, triazadecenium cation, triazinium cation, triazolium cation, iso-triazolium cation, or uronium cation, wherein M has a valence of a; a is 1, 2, or 3; A is N, O, Si, or C; x is 1, 2, 3, 4, 5, or 6; y is 1, 2, or 3; b is 1, 2, or 3; i is 1, 2, or 3; j is 1, 2, or 3; a/b=j/i; and when y is 2 or 3, the $(SO_2C_xF_{2x+1})$ moieties are the same or different.

2. The electrolyte composition as claimed in claim 1, wherein the metal chloride is aluminum chloride, iron chloride, zinc chloride, copper chloride, manganese chloride, chromium chloride, or a combination thereof.

3. The electrolyte composition as claimed in claim 1, wherein the chlorine-containing ionic liquid comprises ammonium chloride, azaannulenium chloride, azathiazolium chloride, benzimidazolium chloride, benzofuranium chloride, benzotriazolium chloride, borolium chloride, cholinium chloride, cinnolinium chloride, diazabicyclodecenium chloride, diazabicyclononenium chloride, diazabicyclo-undecenium chloride, dithiazolium chloride, furanium chloride, guanidinium chloride, imidazolium chloride, indazolium chloride, indolinium chloride, indolium chloride, morpholinium chloride, oxaborolium chloride, oxaphospholium chloride, oxazinium chloride, oxazolium chloride, iso-oxazolium chloride, oxathiazolium chloride, pentazolium chloride, phospholium chloride, phosphonium chloride, phthalazinium chloride, piperazinium chloride, piperidinium chloride, pyranium chloride, pyrazinium chloride, pyrazolium chloride, pyridazinium chloride, pyridinium chloride, pyrimidinium chloride, pyrrolidinium chloride, pyrrolium chloride, quinazolinium chloride, quinolinium chloride, iso-quinolinium chloride, quinoxalinium chloride, selenozolium chloride, sulfonium chloride, tetrazolium chloride, iso-thiadiazolium chloride, thiazinium chloride, thiazolium chloride, thiophenium chloride, thiuronium chloride, triazadecenium chloride, triazinium chloride, triazolium chloride, iso-triazolium chloride, or uronium chloride.

4. The electrolyte composition as claimed in claim 1, wherein the chlorine-containing ionic liquid comprises methylimidazolium chloride, 1-ethyl-3-methylimidazolium chloride, 1-butyl-3-methylimidazolium chloride, cholinium chloride, or a combination thereof.

5. The electrolyte composition as claimed in claim 1, wherein the molar ratio of the metal chloride to the chlorine-containing ionic liquid is from 1.1 to 2.05.

6. The electrolyte composition as claimed in claim 1, wherein the amount of additive is from 1 wt % to 10 wt %, based on the total weight of the metal chloride and the chlorine-containing ionic liquid.

7. The electrolyte composition as claimed in claim 1, wherein the additive is 1-ethyl-3-methylimidazolium triflate ([EMI$^+$][OTf$^-$]) or 1-butyl-3-methylimidazolium triflate ([BMI$^+$][OTf$^-$]).

8. The electrolyte composition as claimed in claim 1, wherein the additive is 1-ethyl-3-methylimidazolium-bis(trifluoromethylsulfonyl)imide ([EMI$^+$][TFSI$^-$]) or 1-butyl-3-methylimidazolium-bis(trifluoromethylsulfonyl)imide ([BMI$^+$][TFSI$^-$]).

9. A metal-ion battery, comprising:
   a positive electrode;
   a separator;
   a negative electrode, wherein the negative electrode and the positive electrode are separated from each other by the separator; and
   the electrolyte composition of claim 1 disposed between the positive electrode and the negative electrode.

10. The metal-ion battery as claimed in claim 9, wherein the positive electrode comprises a current collector and an active material.

11. The metal-ion battery as claimed in claim 10, wherein the current collector is conductive carbon substrate.

12. The metal-ion battery as claimed in claim 11, wherein the conductive carbon substrate is carbon cloth, carbon felt, or carbon paper.

13. The metal-ion battery as claimed in claim 9, wherein the active material is layered carbon material, vanadium oxide, or metal sulfide.

14. The metal-ion battery as claimed in claim 13, wherein the layered carbon material is graphite, carbon nanotube, graphene, or a combination thereof.

15. The metal-ion battery as claimed in claim 14, wherein the graphite is natural graphite, artificial graphite, pyrolytic graphite, foamed graphite, flake graphite, expanded graphite, or a combination thereof.

16. The metal-ion battery as claimed in claim 9, wherein the negative electrode comprises a metal or an alloy of the metal, a current collector, or a combination thereof.

17. The metal-ion battery as claimed in claim 16, wherein the metal or the alloy of the metal comprises copper, iron, aluminum, zinc, indium, nickel, tin, chromium, yttrium, titanium, manganese, or molybdenum.

18. The metal-ion battery as claimed in claim 9, wherein the separator is glass fibers, polyethylene, polypropylene, nonwoven fabric, wood fibers, poly(ether sulfones), ceramic fibers, or a combination thereof.

\* \* \* \* \*